(12) United States Patent
Samuel

(10) Patent No.: US 6,797,249 B2
(45) Date of Patent: Sep. 28, 2004

(54) PROCESS FOR THE PREPARATION OF AMORPHOUS SILICA

(75) Inventor: Joshua Samuel, Jerusalem (IL)

(73) Assignee: Promeks AS, Frekhaug (NO)

( * ) Notice: Subject to any disclaimer, the term of this patent is extended or adjusted under 35 U.S.C. 154(b) by 274 days.

(21) Appl. No.: 10/182,775

(22) PCT Filed: Jan. 15, 2001

(86) PCT No.: PCT/IL01/00038

§ 371 (c)(1),
(2), (4) Date: Aug. 1, 2002

(87) PCT Pub. No.: WO01/58807

PCT Pub. Date: Aug. 16, 2001

(65) Prior Publication Data

US 2003/0003041 A1 Jan. 2, 2003

(30) Foreign Application Priority Data

Feb. 10, 2000 (IL) .................................. 134477

(51) Int. Cl.$^7$ ............................................... C01B 33/12
(52) U.S. Cl. .................... 423/335; 423/158; 423/163; 423/331
(58) Field of Search ................................ 423/158, 163, 423/331, 335, 497

(56) References Cited

U.S. PATENT DOCUMENTS 1,868,499 A  *  7/1932  Guertler ..................... 423/123
4,118,227 A  *  10/1978  Shiohara et al. ............ 106/470
4,689,315 A  *  8/1987  Anton et al. ................ 502/241
5,993,758 A  *  11/1999  Nehari et al. ............... 423/126

FOREIGN PATENT DOCUMENTS

| CS | 266 793 | 1/1990 |
| GB | 2 205 558 | 12/1988 |
| JP | 48 099097 | 12/1973 |
| RO | 79 356 | 6/1982 |
| WO | 97 22554 | 6/1997 |
| WO | 99 08959 | 2/1999 |

* cited by examiner

Primary Examiner—Ngoc-Yen Nguyen
(74) Attorney, Agent, or Firm—Oblon, Spivak, McClelland, Maier & Neustadt, P.C.

(57) ABSTRACT

The invention provides a process for the production of amorphous silica from a silica-based material having a silica content of at least 90% comprising: a) heating said silica-based material with $CaCl_2$, at a temperature in the range of about 900° C. to about 1,200° C. and in the presence of water vapor in excess of the stoichiometric amount needed for the reaction: $x\ CaCl_2 + y\ SiO_2 + x\ H_2O \rightarrow (CaO)_x \cdot (SiO_2)_y + 2x\ HCl$ wherein x is equal to or greater than y to obtain a conversion of said silica-based material to calcium silicates in excess of 99.9%; b) Leaching said calcium silicates with HCl to form a solution of $CaCl_2$ with insoluble silica; c) separating said insoluble silica from solution; and d) recycling the $CaCl_2$ solution from step "c" to step "a".

5 Claims, No Drawings

PROCESS FOR THE PREPARATION OF AMORPHOUS SILICA

The present invention relates to the production of pure amorphous silica from silica-based materials (>90% silica) while recycling reagents used in the process excepting the silica-based raw material.

Amorphous silica is mainly produced by acidulation of a soluble silicate, commonly by addition of sulfuric or hydrochloric acid to a sodium silicate (water glass) solution. The products produced by this method are termed precipitated silica or silica gel depending upon the details of the neutralization of the silicate solution by the acid. An additional method for producing an amorphous silica is by means of reaction of silicon tetrachloride or of a silicon alkoxide with hydrogen and oxygen, forming fumed silica and a byproduct such as HCl when starting from the chloride.

Silica produced by neutralization of a soluble silicate and fumed silica are invariably amorphous, if not subsequently heated above temperatures at which crystalline silica begins to form (>800 C.). Crystaline silica has been deemed a cancer suspect agent by inhalation, hence it is advantageous to produce an amorphous silica powder. Crystalinity is defined as the presence of a crystalline form of silica, quartz, cristobalite or tridamite, at levels in excess of 0.1% as detected by powder x-ray diffraction. The level of 0.1% being the accepted limit of detection for crystalline silica in amorphous silica.

Methods for preparation of amorphous silica from soluble silicates are well established, but suffer from the disadvantage that a soluble alkalai silicate and mineral acid are consumed in the production process.

A method in which an aluminosilicate is mixed with calcium chloride, baked at an elevated temperature (calcined) and leached with hydrochloric acid has been proposed in U.S. Pat. No. 1,868,499, however silica is considered an unwanted byproduct of alumina production in this patent. In PCT WO 97/22554 the authors propose a method whereby an aluminosilicate is calcined with $CaCl_2$ and both an alumina and a silica product are produced. No indication is given as to the amorphous nature of the silica.

When using an aluminosilicate raw material, silica is only a fraction of the raw material, and the metal chlorides must be dealt with.

Amorphous silica has also been produced in U.S. Pat. No. 4,689,315, by autoclaving a siliceous material and a source of calcium such as quicklime and afterwards leaching the calcium silicate with an acid. This approach suffers from the drawback that the lime and HCl are consumed in the process.

DESCRIPTION OF THE INVENTION

A primary objective of this invention is to provide a method for the production of amorphous high surface silica directly from a quartz while recycling all reagents used in the process excepting the silica-based raw material.

An additional objective is to produce amorphous porous silica without the need for a soluble silicate source, and a mineral acid, which is consumed in the process.

An additional objective is to produce pure amorphous porous silica from waste materials, both crystalline and non-crystalline.

DETAILED DESCRIPTION OF THE INVENTION

Thus, according to the present invention there is now provided a process. for the production of amorphous silica from quartz having a silica content of at least 90% comprising:

a) heating said quartz with $CaCl_2$, at a temperature in the range of about 900° C. to about 1,200° C., wherein the wt/wt ratio of $CaCl_2$ to the quartz is greater than 3 and in the presence of water vapor in excess of the stoichiometric-amount needed for the reaction:

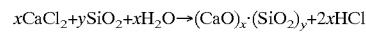

wherein x is greater than y
to obtain a conversion of said quartz to calcium silicates in excess of 99.9% and wherein said calcium silicate is primarily in the form of dicalcium silicate of the formula $(CaO)_2 \cdot (SiO_2)$;

b) Leaching said calcium silicates with HCl to form a solution of $CaCl_2$ with insoluble silica;

c) Separating said insoluble silica from solution; and d) Recycling the $CaCl_2$ solution from step "c" to step "a".

In WO-A-99/08959 and WO-A-97-22554 there are described processes for producing Silica Acid wherein reactions similar to those carried out in the present process are described, however, in both of said publications the process is not carried out on quartz having a silica content of at least 90% and neither of said publications teaches or suggests the manner of producing amorphous silica from such quartz. More specifically, the reactions between alumina silicates; such as clays and coal ash and calcium, lead to calcium alumina silicates such an anorthite, which have a specific and determined x-ray diffraction spectra which define them. On the other hand, the reaction between calcium and quartz such as quartz yields calcium silicates with different characteristics and which can be identified by diffraction spectra.

The essential point of the present invention is to obtain amorphous silica from quartz containing above 90% silica by calcination with $CaCl_2$. This is not possible using the conditions detailed in either of the above publications. The condition stated expressly hereinafter in the present text, i.e., that there must be used a high ratio of $CaCl_2$ to raw material, i.e., above the level needed to produce a dicalcium silicate is critical since without the use of this ratio an amorphous material is not obtained. As shown, e.g., in example 1, using a sample of quartz dust containing 98% silica the same was mixed with a $CaCl_2$ solution to give a quartz: $CaCl_2$ ratio of 1:3.9. This is above the ratio given in either of the above publications since this requirement was not taught or suggested therein. Thus, e.g., in WO 99/08959 on page 7 there is described reaction 4 as follows:

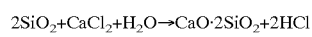

wherein the production of calcium disilicate rather than the production of dicalcium silicate is taught and suggested.

The process can be used with any silica bearing material containing >90% silica. This includes both crystalline forms such as quartz and amorphous materials such as silica dust such as that produced in the production of ferrosilicone. The process consists of the following steps:

1) The silica containing material is mixed with a $CaCl_2$ solution at a raw material: $CaCl_2$ ratio of 1:2–1:4 preferably between 1:3–1:4.

2) The mixture is calcined at a temperature of 900–1200° C. for a period between 0.5 to 2 hours, depending on temperature. The material is calcined under an atmosphere containing water vapor at a w/w concentration of at least 5% and preferably at least 7%.

The preferred calcination temperature is 1000–1100° C. and calcination time of 1–2 hours.

3) The calcined bake is leached in an HCl solution with a stoichiometric excess of HCl of at least 20%. The slurry produced from leaching contains silica, calcium chloride, excess HCl and impurities as metal chlorides.

4) HCl produced during calcination is absorbed in a scrubber and reused in stage 3.
5) The silica is separated by filtration. The separated solution contains excess HCl, calcium chloride and impurities.
6) Excess HCl is removed from the leaching solution and the $CaCl_2$ is reused in stage 1.

In a preferred embodiment of the present invention, impurities are removed from the $CaCl_2$ solution before recycling to step "a", to avoid the buildup of impurities, as is common practice in hydrometallurgical processes.

Thus, in preferred embodiments of the present invention. impurities are substantially removed from solution produced in step b, and the purified solution recycled to step a, said impurities being selected from a group consisting of titanium, aluminum, vanadium, iron and nickel In especially preferred embodiments of the present invention said amorphous silica product which is a product of step "c" is free of all. crystalline forms to a level of 0.2%.

The preferred method of purification is by increasing the pH of the solution produced in step five to pH~10 by addition of lime or slaked lime and filtration of precipitated hydroxides.

When quartz is used as the raw material particular care must be taken to avoid residual quartz in the silica product. In a preferred embodiment to avoid residual quartz, the quartz raw material used has a particle size <100 microns; and the $CaCl_2$ to quartz wt/wt ratio is >3.

As was detailed in the background of invention, decomposition and purification of alumina and silica by calcination with $CaCl_2$, has been detailed in PCT WO 97/22554. Although the amorphous nature of the silica was not described in said patent aluminosilicates, when calcined with $CaCl_2$, yield an amorphous silica product without special precautions. This is because the compounds and phases formed during calcination of aluminosilicates are alumina; silica-calcium compounds such as anorthite, as opposed to calcium silicates formed when calcining quartz with $CaCl_2$.

In the case of quartz it has now been found, according to the present invention, that special steps are to, be taken to ensure the production of an amorphous product. To obtain an amorphous product it is necessary to ensure essentially full conversion of the silica to a calcium silicate. If this does not take place, and especially if the raw material is quartz, quartz will remain in the silica product. When the raw material is an amorphous non-porous silica such as microsilica, the amorphous silica will be converted to cristobalite at the calcination temperatures used. Thus, the special steps according to the present invention, as described above for preferred embodiments of the present invention are particularly:

a) Addition of water vapor considerably above the amount needed stoichiometricaly to convert $CaCl_2$ to CaO and HCl, where the CaO is associated with silica. The excess water vapor facilitates the reaction by increasing activity of the silica, particularly in the case of quartz which is the most inert form of silica, and exhibits appreciable solubility only under hydrothermal conditions;

b) Reduction of particle size of raw material; and c) Use of a high ratio of $CaCl_2$ to raw material. In the case of quartz, above the level needed to produce a dicalcium silicate.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is, believed to be the most useful and readily understood description of formulation procedures as well as of the principles and conceptual aspects of the invention.

EXAMPLE 1

Quart Powder

A sample of quartz dust, a waste material containing 98% silica was sieved on a 45 micron sieve and the −45 micron fraction mixed with a $CaCl_2$ solution to give a quartz $CaCl_2$ ratio of 1:3.9 The mixture was dried at 220° C. in a box furnace for 4 hours. Ten grams of the dried mixture was calcined in a tube furnace for two hours at a temperature of 1000° C. with airflow of 0.6 liters /min and water vapor added at a rate of 30 ml water/hour, 6.03 grams. The bake was leached in a 20% solution of hydrochloric acid at a w:v ratio of 1:10 for 1.5 hours under reflux. The silica slurry was filtered and washed thoroughly on the filter. The silica was dried until constant weight (1.9 grams) at a temperature of 120° C. The silica product had a BET surface area of 450 $m^2$/gram. The sum of impurities found was 0.16%. The impurities contained in the silica, as oxides, were as follows:

Ca=0.09%; Al=0.037%; Ti=0.024%, Fe=0.002%, Ni=0.001%; Mg.=0.001% Na=0.003% and K=0.003%. The silica sample was found to be amorphous . The sample was tested for crystalline content by measurement of the X ray diffraction of the sample and comparison of the diffractogram to calibration standards of quartz and cristobalite in amorphous silica. The quantitative measurement was carried out by step scanning and integration of the major diffraction peak.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for the production of amorphous silica from quartz having a silica content of at least 90% comprising:

a) heating said quartz with $CaCl_2$, at a temperature in the range of about 900° C. to about 1,200° C., wherein the wt/wt ratio of $CaCl_2$ to the quartz is greater than 3 and in the presence of water vapor, in excess of the stoichiometric amount needed for the reaction:

$$xCaCl_2 + ySiO_2 + xH_2O \rightarrow (CaO)_x \cdot (SiO_2)_y + 2xHCl$$

wherein x is greater than y to obtain a conversion of said quartz to calcium silicates in excess of 99.9% and wherein said calcium silicate is primarily in the form of dicalcium silicate of the formula $(CaO)_2 \cdot (SiO_2)$;

b) Leaching said calcium silicates with HCl to form a solution of $CaCl_2$ with insoluble silica;

c) Separating said insoluble silica from solution; and d) Recycling the $CaCl_2$ solution from step "c" to step "a".

2. A process according to claim 1, wherein impurities are substantially removed from solution produced in step b, and the purified solution recycled to step a, said impurities being selected from a group consisting of titanium, aluminum, vanadium, iron and nickel.

3. A process according to claim 1, wherein said amorphous silica product which is a product of step "c" is free of all crystalline forms to a level of 0.2%.

4. A process according to claim 1 wherein the particle size is <100 micron.

5. A process according to claim 1, wherein step "a" is carried out under an atmosphere containing water vapor at a w/w concentration of at least 5%.

* * * * *